United States Patent
Navratil et al.

(10) Patent No.: US 7,447,633 B2
(45) Date of Patent: Nov. 4, 2008

(54) METHOD AND APPARATUS FOR TRAINING A TEXT INDEPENDENT SPEAKER RECOGNITION SYSTEM USING SPEECH DATA WITH TEXT LABELS

(75) Inventors: Jiri Navratil, White Plains, NY (US); James H. Nealand, Boambee East (AU); Jason W. Pelecanos, Ossining, NY (US); Ganesh N. Ramaswamy, Mohegan Lake, NY (US); Ran D. Zilca, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 10/994,743

(22) Filed: Nov. 22, 2004

(65) Prior Publication Data

US 2006/0111905 A1 May 25, 2006

(51) Int. Cl.
*G10L 17/00* (2006.01)
*G10L 15/00* (2006.01)
*G10L 15/14* (2006.01)

(52) U.S. Cl. ............ 704/250; 704/246; 704/247; 704/249; 704/256

(58) Field of Classification Search ......... 704/246–250, 704/273
See application file for complete search history.

(56) References Cited

U.S. PATENT DOCUMENTS

| | | | | |
|---|---|---|---|---|
| 5,598,507 A | * | 1/1997 | Kimber et al. | 704/246 |
| 5,677,988 A | * | 10/1997 | Takami et al. | 704/256 |
| 5,799,277 A | * | 8/1998 | Takami | 704/256.4 |
| 5,839,105 A | * | 11/1998 | Ostendorf et al. | 704/256 |
| 5,995,927 A | * | 11/1999 | Li | 704/246 |
| 6,055,498 A | * | 4/2000 | Neumeyer et al. | 704/246 |
| 6,141,644 A | * | 10/2000 | Kuhn et al. | 704/273 |
| 6,401,063 B1 | * | 6/2002 | Hebert et al. | 704/234 |
| 6,411,930 B1 | * | 6/2002 | Burges | 704/240 |
| 6,499,012 B1 | * | 12/2002 | Peters et al. | 704/256.4 |

(Continued)

OTHER PUBLICATIONS

Stolcke, Andreas et al., "Hidden Markov Model Induction by Bayesian Model Merging," 1993, Advances in Neural INformation Processing Systems 5, San Mateo, CA, Margan Kaugman.*

(Continued)

*Primary Examiner*—Talivaldis Ivars Smits
*Assistant Examiner*—Douglas C Godbold
(74) *Attorney, Agent, or Firm*—Keusey, Tutunjian & Bitetto, P.C.; Anne V. Dougherty, Esq.

(57) ABSTRACT

There is provided an apparatus for providing a Text Independent (TI) speaker recognition mode in a Text Dependent (TD) Hidden Markov Model (HMM) speaker recognition system and/or a Text Constrained (TC) HMM speaker recognition system. The apparatus includes a Gaussian Mixture Model (GMM) generator and a Gaussian weight normalizer. The GMM generator is for creating a GMM by pooling Gaussians from a plurality of HMM states. The Gaussian weight normalizer is for normalizing Gaussian weights with respect to the plurality of HMM states.

14 Claims, 7 Drawing Sheets

U.S. PATENT DOCUMENTS

| | | | | |
|---|---|---|---|---|
| 6,697,778 | B1* | 2/2004 | Kuhn et al. | 704/243 |
| 6,760,701 | B2* | 7/2004 | Sharma et al. | 704/249 |
| 6,882,972 | B2* | 4/2005 | Kompe et al. | 704/255 |
| 7,171,360 | B2* | 1/2007 | Huang et al. | 704/245 |
| 7,181,393 | B2* | 2/2007 | Lu et al. | 704/243 |
| 7,209,881 | B2* | 4/2007 | Yoshizawa et al. | 704/233 |
| 2002/0165717 | A1* | 11/2002 | Solmer et al. | 704/256 |
| 2007/0198265 | A1* | 8/2007 | Yao | 704/254 |

OTHER PUBLICATIONS

Chiwei Che et al.; An HMM Approach to Text Prompted Speaker Verification; ICASSP, Mar. 1996; pp. 673-676.

D.E. Sturim et al.; Speaker Verification using Text-Constrained Gaussian Mixture Models; ICASSP, Sep. 2002; pp. 1-677 to 1-680.

D.A. Reynolds et al.; Speaker Verification Using Adapted Gaussian Mixture Models; Digital Signal Processing; 2000; pp. 19-41.

* cited by examiner

METHOD AND APPARATUS FOR TRAINING A TEXT INDEPENDENT SPEAKER RECOGNITION SYSTEM USING SPEECH DATA WITH TEXT LABELS

FIELD OF THE INVENTION

The present invention generally relates to the authentication and identification of an individual and, more particularly, to the ability to recognize the identity of a speaker given a sample of his/her voice.

BACKGROUND OF THE INVENTION

Current speaker recognition systems use different modeling approaches for different levels of text dependency. For example, a Text Independent (TI) system designed to work on free conversational speech would use Gaussian Mixture Models (GMM), typically adapted from another global GMM referred to as a Universal Background Model (UBM). Alternatively, for example, a Text Constrained (TC) speaker recognition system designed to work only on spoken digits would use a Hidden Markov Model (HMM) as a UBM, and adapt target speaker models that also are HMMs. For a digit system the HMM may be a word HMM comprised of a HMM for every individual digit, as described by Che et al., in "An HMM Approach to Text-Prompted Speaker Verification", ICASSP, 1996. That is, rearranged according to the prior knowledge of the spoken digit string. For a system that expects another (perhaps wider) subset of the spoken language, a phonetic HMM may be trained, that includes a more complicated structure and more symbols. Finally, for a passphrase Text Dependent (TD) speaker recognition system, a rigid HMM will typically be trained for the target model, or the corresponding phonetic subset will be adapted from a phonetic UBM.

All of the above modeling techniques employ Gaussian mixtures for estimating the Probability Density Functions (PDF) of the speaker features, either as the model itself (GMM) or as the PDF of individual states in a HMM. However, the current target model training and adaptation techniques for each system are different. GMM training involves determining the Gaussian values only. HMM training involves training both the Gaussian values and the state structure and transition probabilities at the same time. As a result, separate speaker recognition systems are employed when different levels of text dependency are expected, and users need to enroll in each system independently if they need to use all of them.

FIG. 1 is a block diagram illustrating a combination TI/conversational and TD/TC speaker recognition system 100, according to the prior art. The system 100 is actually made up of essentially a separate TI/conversational speaker verification system 101 and essentially a separate TD/TC speaker verification system 102.

The speaker verification systems 101 and 102 share a microphone/telephone (hereinafter "microphone") 105. The microphone 105 is connected in signal communication with the TI/conversational speaker verification system 101 and with the TD/TC speaker verification system 102. The TI/conversational verification recognition system 101 is also connected in signal communication with a database of TI user voiceprints 110. The TD/TC speaker verification system 102 is also connected in signal communication with a database of TD user voiceprints 120. Outputs of the TI/conversational speaker verification system 101 and the TD/TC speaker verification system 102 are outputs of the combination TI/conversational and TD/TC speaker recognition system 100, and provide speaker recognition decisions and similarity scores.

Accordingly, it would be desirable and highly advantageous to have a single speaker recognition system and method capable of different levels of text dependency.

SUMMARY OF THE INVENTION

These and other drawbacks and disadvantages of the prior art are addressed by the present invention, which is directed to speaker recognition.

According to an aspect of the present invention, there is provided an apparatus for providing a Text Independent (TI) speaker recognition mode in one of a Text Dependent (TD) Hidden Markov Model (HMM) speaker recognition system and a Text Constrained (TC) HMM speaker recognition system. The apparatus includes a Gaussian Mixture Model (GMM) generator and a Gaussian weight normalizer. The GMM generator is for creating a GMM by pooling Gaussians from a plurality of HMM states. The Gaussian weight normalizer is for normalizing Gaussian weights with respect to the plurality of HMM states.

According to another aspect of the present invention, there is provided an apparatus for providing one of a Text Dependent (TD) Hidden Markov Model (HMM) speaker recognition mode and a Text Constrained (TC) HMM speaker recognition mode in a Text Independent (TI) Gaussian Mixture Model (GMM) speaker recognition system. The apparatus includes an HMM generator and a probability and weight calculator. The HMM generator is for creating an HMM by assigning states to Gaussians from a GMM. The probability and weight calculator is for calculating state transition probabilities and Gaussian weights with respect to a plurality of HMM states.

According to yet another aspect of the present invention, there is provided an apparatus for providing one of a Text Dependent (TD) Hidden Markov Model (HMM) speaker recognition mode and a Text Constrained (TC) HMM speaker recognition mode in another one of a TD HMM speaker recognition system and a TC HMM speaker recognition system. The apparatus includes an HMM generator and a Gaussian weight normalizer. The HMM generator is for creating an HMM with one of a smaller number of states and a larger number of states by one of pooling Gaussians from a plurality of HMM states into a single HMM state and splitting the Gaussians from the plurality of HMM states into different HMM states, respectively. The Gaussian weight normalizer is for normalizing Gaussian weights with respect to the HMM states.

According to an additional aspect of the present invention, there is provided a method for providing a Text Independent (TI) speaker recognition mode in one of a Text Dependent (TD) Hidden Markov Model (HMM) speaker recognition system and a Text Constrained (TC) HMM speaker recognition system. The method includes the steps of creating a Gaussian Mixture Model (GMM) by pooling Gaussians from a plurality of HMM states, and normalizing Gaussian weights with respect to the plurality of HMM states.

According to a further aspect of the present invention, there is provided a method for providing one of a Text Dependent (TD) Hidden Markov Model (HMM) speaker recognition mode and a Text Constrained (TC) HMM speaker recognition mode in a Text Independent (TI) Gaussian Mixture Model (GMM) speaker recognition system. The method includes the steps of creating an HMM by assigning states to Gaussians from a GMM, and calculating state transition probabilities and Gaussian weights with respect to a plurality of HMM states.

According to a yet further aspect of the present invention, there is provided a method for providing one of a Text Dependent (TD) Hidden Markov Model (HMM) speaker recognition mode and a Text Constrained (TC) HMM speaker recognition mode in another one of a TD HMM speaker recognition system and a TC HMM speaker recognition system. The method includes the step of creating an HMM with one of a smaller number of states and a larger number of states by one of pooling Gaussians from a plurality of HMM states into a single HMM state and splitting the Gaussians from the plurality of HMM states into different HMM states, respectively. The method further includes the step of normalizing Gaussian weights with respect to the HMM states.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION OF PREFERRED EMBODIMENTS

Figure 1:
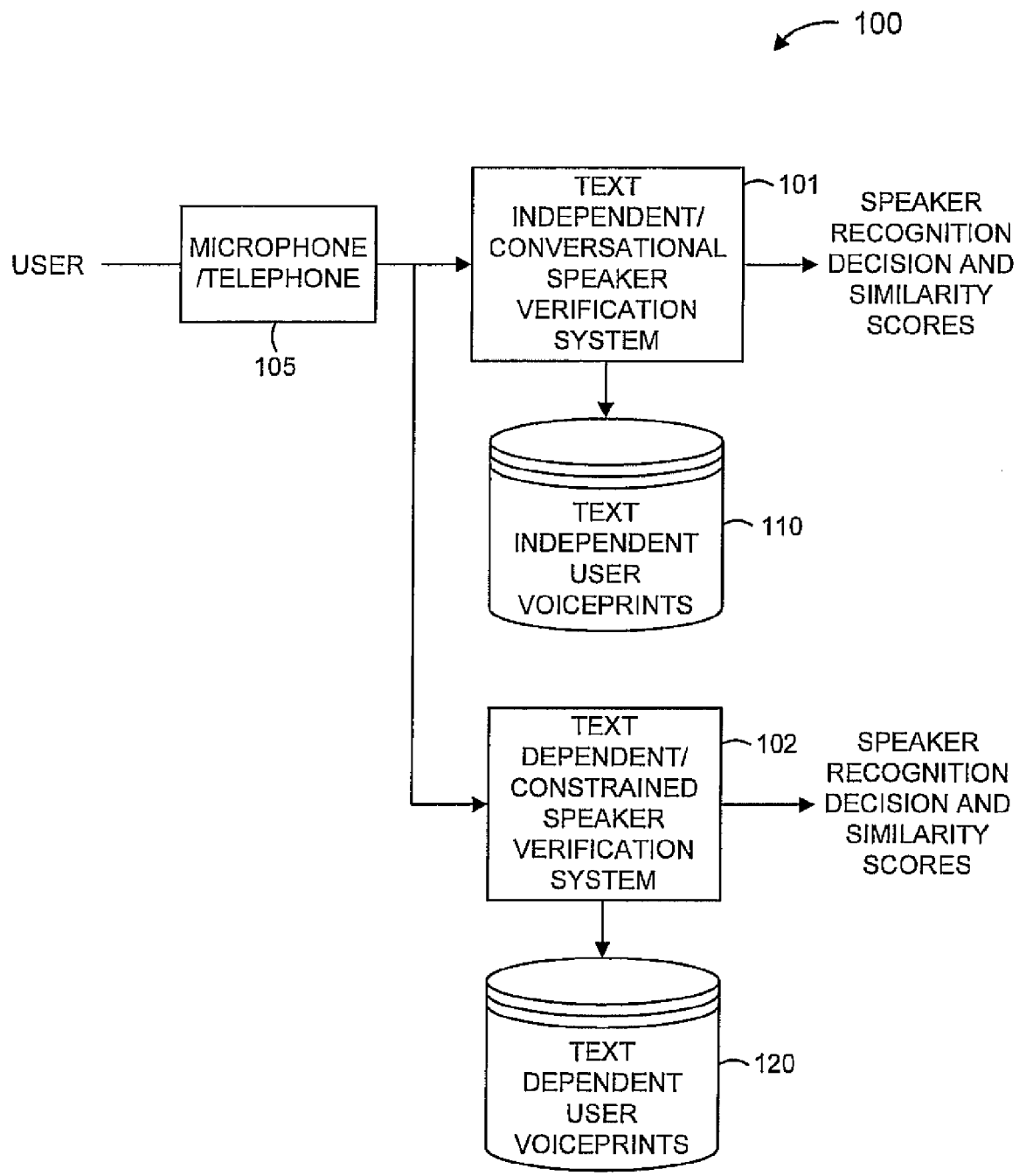
FIG. 1 is a block diagram illustrating a combination Text Independent/conversational and Text Dependent/Text Constrained speaker recognition system 100, according to the prior art.

The present invention is directed to speaker recognition. The present invention advantageously provides a method and apparatus for creating a Text Dependent (TD) or Text Constrained (TC) speaker recognition system that can also be used in Text Independent (TI) mode, eliminating the need for users to re-enroll. This is accomplished by training a Hidden Markov Model (HMM) based system and then pooling the Gaussians from all the HMM states in a weighted manner to create a Gaussian Mixture Model (GMM).

Thus, the present invention is advantageously capable of providing a single system for speaker recognition irrespective of the level of text dependency. The use of a single speaker recognition system is accomplished by sharing Gaussians across all modes (TD, TC, and TI) of the system, and assigning the state structure of the Gaussian components according to the temporal progression information that is specific to the level of text dependency.

A description will now be given regarding one of the main concepts of the present invention. TI systems typically use GMM modeling and TD and TC systems use HMM modeling. A GMM can be derived from an HMM by pooling all the Gaussians from the HMM regardless of the states they reside in, and then normalizing the weights of the components in the GMM. The weight normalization may be performed using both the state dependent mixture weights of the HMM and the normalized expected duration of each state (as a measure of the prior probability of residing in a state). Using this derivation, TC/TD systems may be converted to TI mode with no need of further user involvement to re-enroll and create a new model for the TI mode. Moreover, a TI system may be created using GMM modeling, and the different Gaussian components in the GMM may be assigned to individual states to model the temporal progression of features, if a TD/TC operation mode is desired in the TI system. Given the teachings of the present invention provided herein, these and various other implementations and variations of the present invention may be readily contemplated by one of ordinary skill in the related art while maintaining the spirit of the present invention.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

As used herein, "TI" represents "text independent", "TD" represents "text dependent", and "TC" represents "text constrained". Moreover, as used herein, "HMM" represents "Hidden Markov Model", "GMM" represents "Gaussian Mixture Models", and "UBM" represents "Universal Background Model".

Figure 2A:
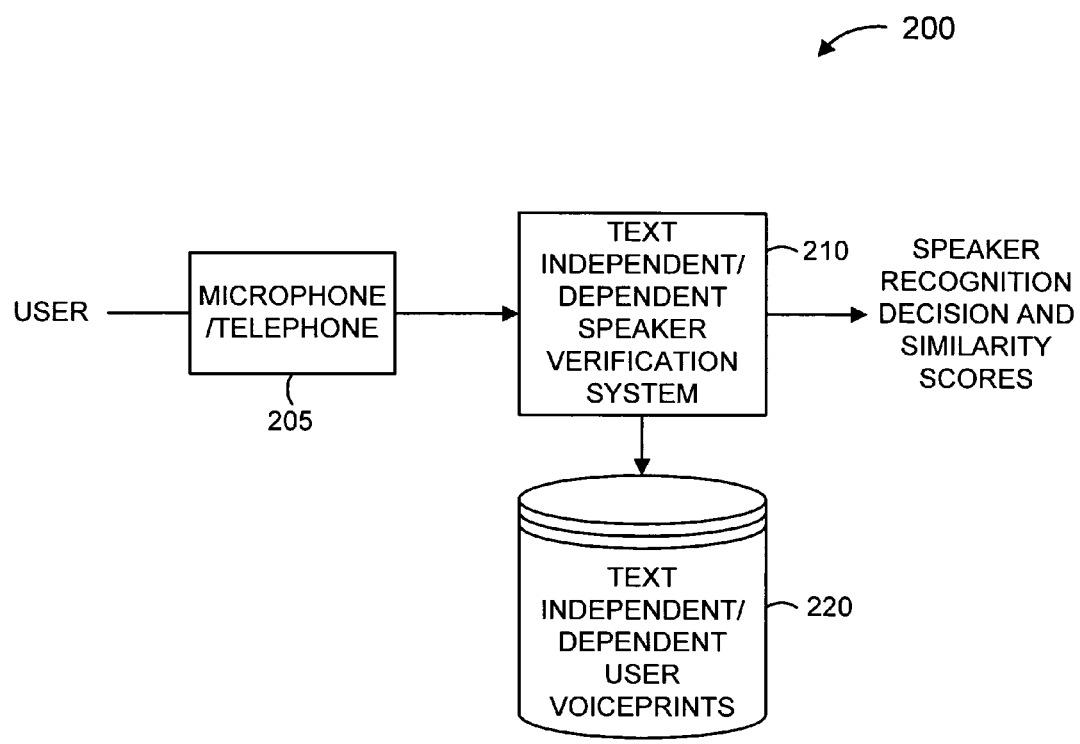
FIG. 2A is a block diagram illustrating a combination Text Independent/Text Dependent speaker recognition system 200, according to the present invention.

FIG. 2A is a block diagram illustrating a combination TI/TD speaker recognition system 200, according to an illustrative embodiment of the present invention. The system 200 includes a microphone/telephone (hereinafter "microphone") 205 connected in signal communication with a TI/TD speaker verification system 210 that, in turn, is connected in signal communication with a database of TI/TD voiceprints 220. An output of the TI/TD speaker verification system 210 is an output of the combination TI/TD speaker recognition system 200, and provides speaker recognition decisions and similarity scores.

Figure 2B:
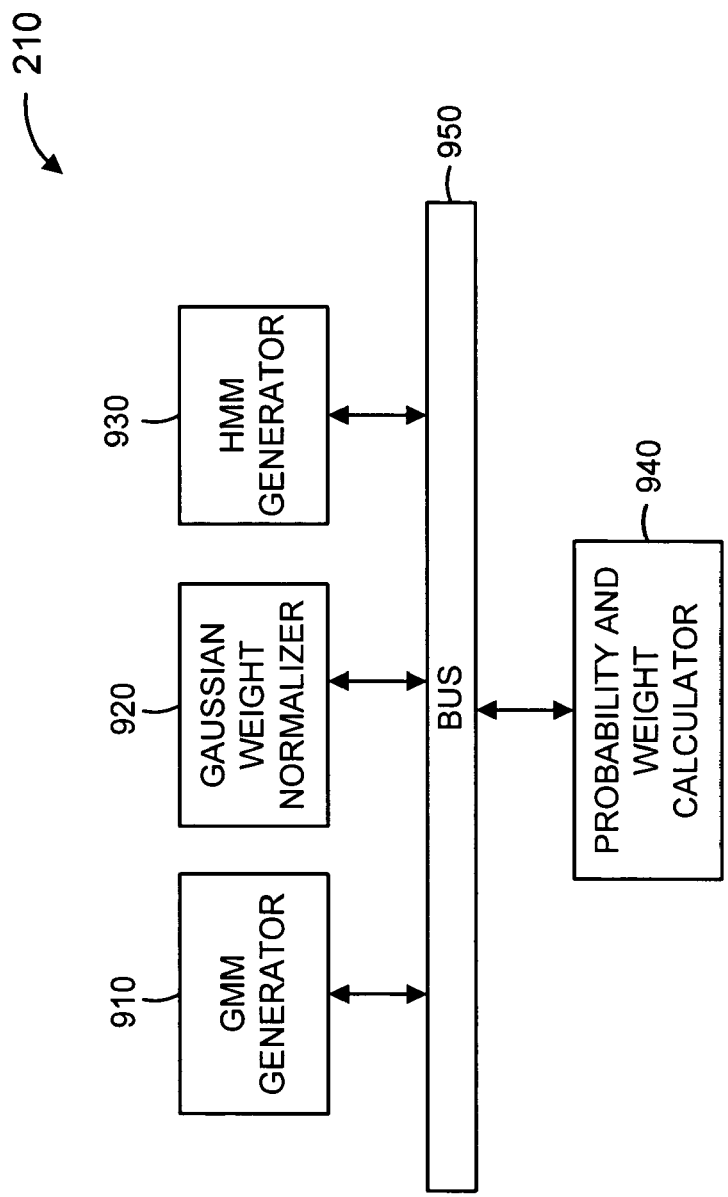
FIG. 2B is a block diagram further illustrating the TI/TD speaker verification system 210 of FIG. 2A, according to an illustrative embodiment of the present invention.

FIG. 2B is a block diagram further illustrating the TI/TD speaker verification system 210 of FIG. 2A, according to an illustrative embodiment of the present invention. The TI/TD speaker verification system 210 includes a GMM generator 910, a Gaussian weight normalizer 920, an HMM generator 930, and a probability and weight calculator 940, all interconnected by a bus 950. It is to be appreciated that the TI/TD speaker verification system 210 may include other elements not shown herein for the sake of brevity and clarity.

Current speaker recognition systems use different modeling approaches for different levels of text dependency. TI systems typically assume that there is no relevant temporal speaker specific information in the speech, apart from the features used, because there is no knowledge of what is being spoken or the inaccuracy of the text labels warrants it. TI systems use GMM modeling which does not explicitly capture temporal dependency information. TD and TC systems typically assume that speaker specific temporal information exists in the speech signal since the spoken text is either known or can be automatically recognized with high accuracy. TD and TC systems typically use HMM modeling. A HMM is a stochastic state machine where every state is usually modeled by a GMM. In addition to the GMM parameters, the HMM also models the transition probabilities between states, thus modeling the temporal properties of the speech signal. In a TD/TC system, individual HMMs may be trained for whole words when the expected vocabulary is relatively small (e.g., digits), or alternatively an individual HMM may be trained for every phoneme or phoneme sequence (e.g., diphones, triphones) when the expected spoken vocabulary is large. In a TD system, a single HMM will typically be used for the pass phrase that the user chooses. In a TC system, a model for the spoken speech of the speaker is created by appending the word or phonetic HMM models into a single larger HMM using a language model that determines the probabilities of transitioning between the individual HMMs. Both HMM and GMM speaker models may either be trained from a flat start, or adapted from a Universal Background Model (UBM). TC and TD systems require knowledge of the spoken text, or using the UBM as a speech recognizer to detect the spoken text automatically.

State of the art speaker recognition systems are either TC, TD or TI, depending on the specifics of the modeling approach. The three systems are independent and are not jointly trained. Therefore, if a user enrolls in a system that accepts only digits (TC system), the user will need to speak again and re-enroll in a text independent system if a text-independent input is also required. The present invention solves this problem by sharing the parameters of the Gaussians across HMM (TD/TC) and GMM (TI) systems. A HMM is first trained, and when a TI speaker recognition task needs to be performed the HMM is converted into a GMM by pooling the Gaussians from all HMM states. In contrast, a user may initially enroll in a TI system (that uses a GMM) and if a TD/TC mode of operation is desired the GMM will be converted into a HMM by grouping Gaussian components in the GMM into states and calculating transition matrices. This may be obtained in several different ways, one of which would be to train the initial GMM as a GMM and maintain the mapping back to HMM if the TD/TC mode is required.

In one embodiment, a UBM HMM is first trained; The HMM may include word models (when a small vocabulary such as digits is expected) or phonetic models (when a larger vocabulary is expected). This configuration allows for TD or TC speaker recognition functionality. Then, to allow the system to additionally work in a TI mode, all Gaussians from all of the HMM UBM states are pooled together, creating a UBM GMM. The UBM GMM can, in turn, be used in TI mode, and also models some text dependency since it was originally trained as an HMM.

In another embodiment, a HMM UBM is first trained, and for TD and TC modes of operations speaker models are trained by adapting speaker specific HMMs. Then, if a TI speaker recognition task is required, all Gaussians are pooled from the speaker HMMs to create a speaker GMM.

Another example is where a HMM is trained from scratch for each speaker with no use of a UBM, and when the speaker needs to be recognized in conversational free text (i.e., TI), all Gaussians are pooled from the HMM to create a GMM.

When the Gaussians are pooled from HMM states to create a GMM, the weights of the Gaussians need to be normalized. This may be achieved by simply dividing the Gaussian weight of every Gaussian by the number of states (assuming a uniform probability of residing in each of the states) or by dividing each Gaussian weight by the expected duration to reside in the state where the Gaussian belongs.

It is to be appreciated that while the present invention is primarily described herein with respect to speaker recognition, given the teachings of the present invention provided herein, it is readily apparent to one of ordinary skill in the related art that the present invention also may be employed with respect to speaker verification, closed set speaker identification, open set speaker identification, speaker classification, speaker segmentation, and speaker change detection, while maintaining the spirit of the present invention.

Figure 3:
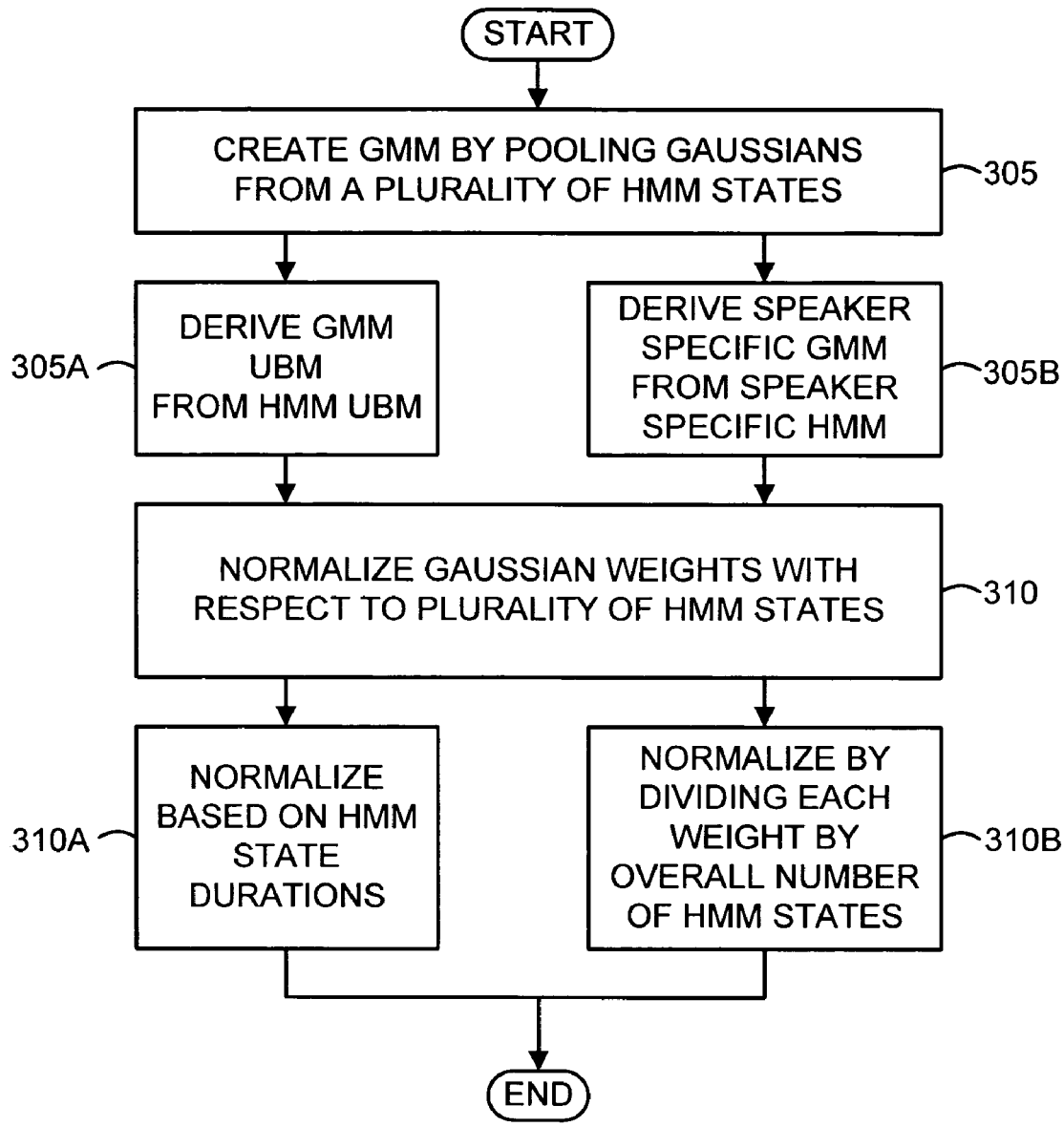
FIG. 3 is a flow diagram illustrating a method for providing a TI speaker recognition mode in a TD HMM speaker recognition system and/or a TC HMM speaker recognition system, according to an illustrative embodiment of the present invention.

FIG. 3 is a flow diagram illustrating a method for providing a TI speaker recognition mode in a TD HMM speaker recognition system and/or a TC HMM speaker recognition system, according to an illustrative embodiment of the present invention.

The TD HMM speaker recognition system and/or the TC HMM speaker recognition system may be based on a single HMM per word, a single HMM per phonetic unit, and/or a single HMM per sub-phonetic unit.

Gaussians from a plurality of HMM states are pooled to create a Gaussian Mixture Model (GMM) (step 305). Step 305 may include the step of deriving a GMM Universal Background Model (UBM) from an HMM UBM (step 305A) and/or deriving a speaker specific GMM from a speaker specific HMM.

Gaussian weights are normalized with respect to the plurality of HMM states (step 310). Step 310 may include the step of normalizing the Gaussian weights based on durations of the plurality of HMM states (step 310) and/or normalizing the Gaussian weights by dividing each of the Gaussian weights by an overall number of the plurality of HMM states (step 310).

Figure 4:
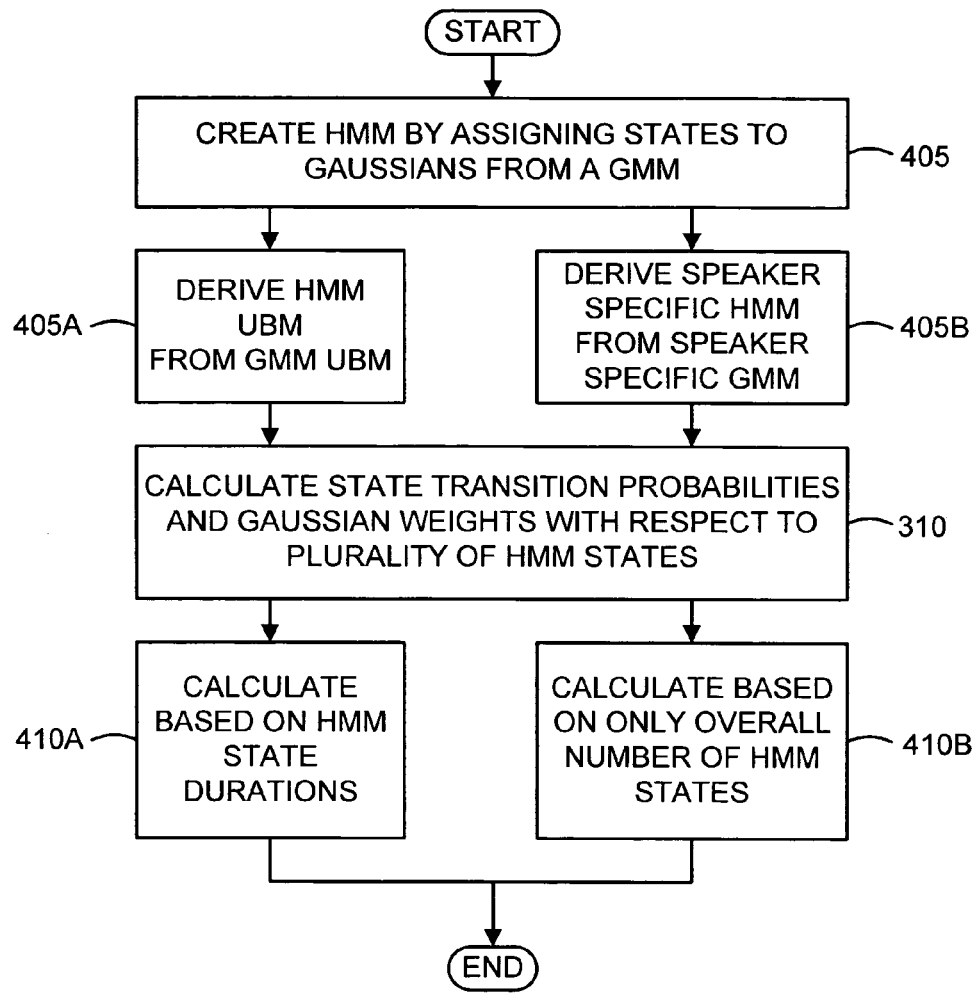
FIG. 4 is a flow diagram illustrating a method for providing a TD HMM speaker recognition mode and/or a TC HMM speaker recognition mode in a TI GMM speaker recognition system, according to an illustrative embodiment of the present invention.

FIG. 4 is a flow diagram illustrating a method for providing a TD HMM speaker recognition mode and/or a TC HMM speaker recognition mode in a TI GMM speaker recognition system, according to an illustrative embodiment of the present invention.

States are assigned to Gaussians from a GMM to create an HMM (step 405). Step 405 may include the step of deriving an HMM UBM from a GMM UBM (step 405A) and/or deriving a speaker specific HMM from a speaker specific GMM (step 405B).

State transition probabilities and Gaussian weights are calculated with respect to a plurality of HMM states (step 410). Step 410 may include the step of calculating the state transition probabilities and the Gaussian weights based on durations of the plurality of HMM states (step 410A) and/or calculating the state transition probabilities and Gaussian weights based on only an overall number of the plurality of HMM states (step 410B).

In the illustrative embodiment of FIG. 4, the TD HMM speaker recognition mode and/or the TC HMM speaker recognition mode may be based on a single HMM per word, a single HMM per phonetic unit, and/or a single HMM per sub-phonetic unit. Moreover, every word may represent a numeric value.

Figure 5:
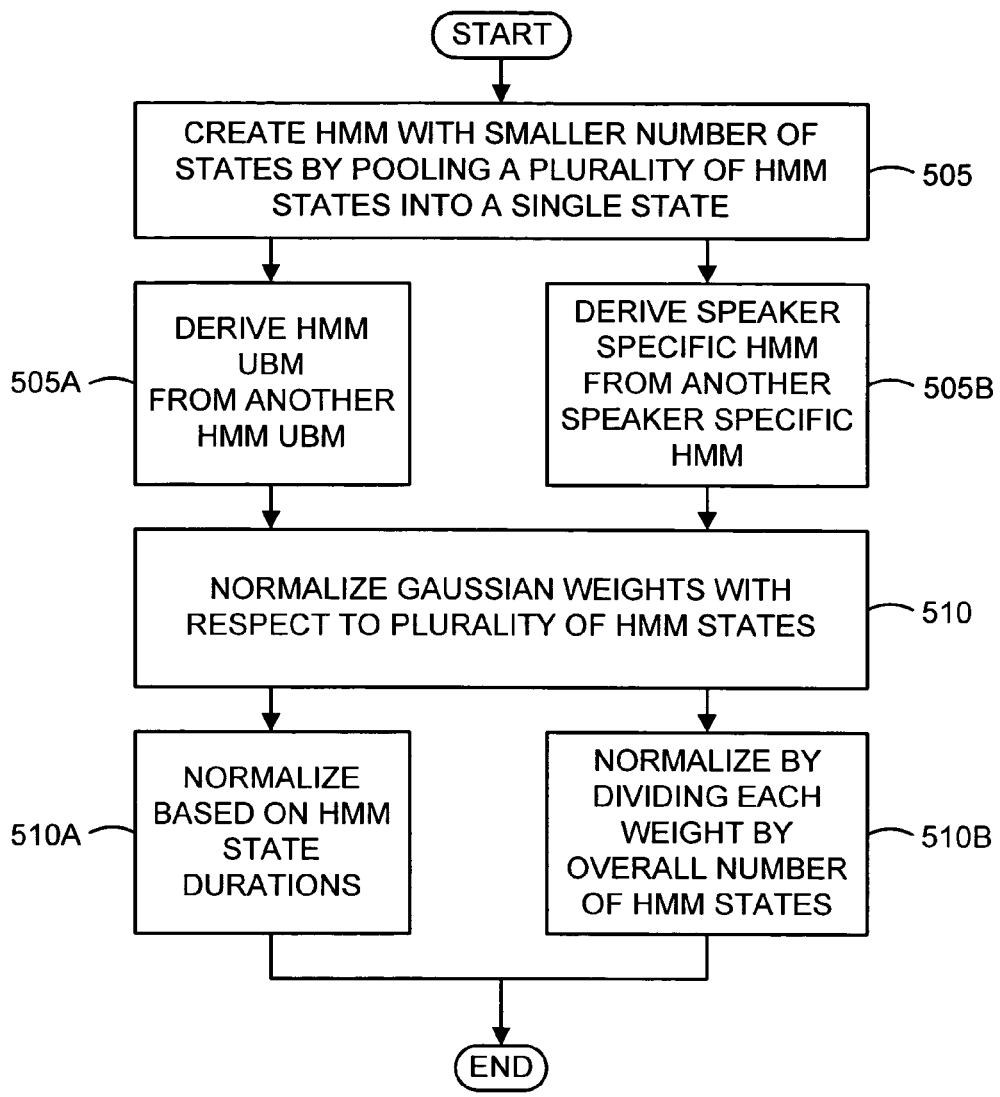
FIG. 5 is a flow diagram illustrating a method for providing a TD HMM speaker recognition mode and/or a TC HMM speaker recognition mode in another TD HMM speaker recognition system and/or TC HMM speaker recognition system, according to an illustrative embodiment of the present invention.

FIG. 5 is a flow diagram illustrating a method for providing a TD HMM speaker recognition mode and/or a TC HMM speaker recognition mode in another TD HMM speaker recognition system and/or TC HMM speaker recognition system, according to an illustrative embodiment of the present invention.

Gaussians from a plurality of HMM states are pooled into a single state to create an HMM with a smaller number of states (step 505). Step 505 may include the step of deriving an HMM Universal Background Model (UBM) from another HMM UBM (step 505A) and/or deriving a speaker specific HMM from another speaker specific HMM (step 505B).

Gaussian weights are normalized with respect to the plurality of HMM states (step 510). Step 510 may include the step of normalizing the Gaussian weights based on durations of the plurality of HMM states (step 510A) and/or normalizing the Gaussian weights by dividing each of the Gaussian weights by an overall number of the plurality of HMM states (step 510B).

In the illustrative embodiment of FIG. 5, the other TD HMM speaker recognition system and/or other TC HMM speaker recognition system may include a single HMM per phoneme, and the TD HMM speaker recognition mode and/or TC HMM speaker recognition mode may include a single HMM per word. In the TD HMM speaker recognition mode and/or the TC HMM speaker recognition mode, every word may represent a numeric value.

Moreover, in the illustrative embodiment of FIG. 5, the other TD HMM speaker recognition system and/or other TC HMM speaker recognition system may include a single HMM per phonetic unit, and the TD HMM speaker recognition mode and/or TC HMM speaker recognition mode may include a single HMM per word. The phonetic unit may be, but is not limited to, a diphone, a triphone, and a sub-phonetic unit. Further, in the TD HMM speaker recognition mode and/or the TC HMM speaker recognition mode, every word may represent a numeric value.

Also, in the illustrative embodiment of FIG. 5, the other TD HMM speaker recognition system and/or other TC HMM speaker recognition system may include a single HMM per word, and the TD HMM speaker recognition mode and/or TC HMM speaker recognition mode may include a single HMM per phrase.

Figure 6:
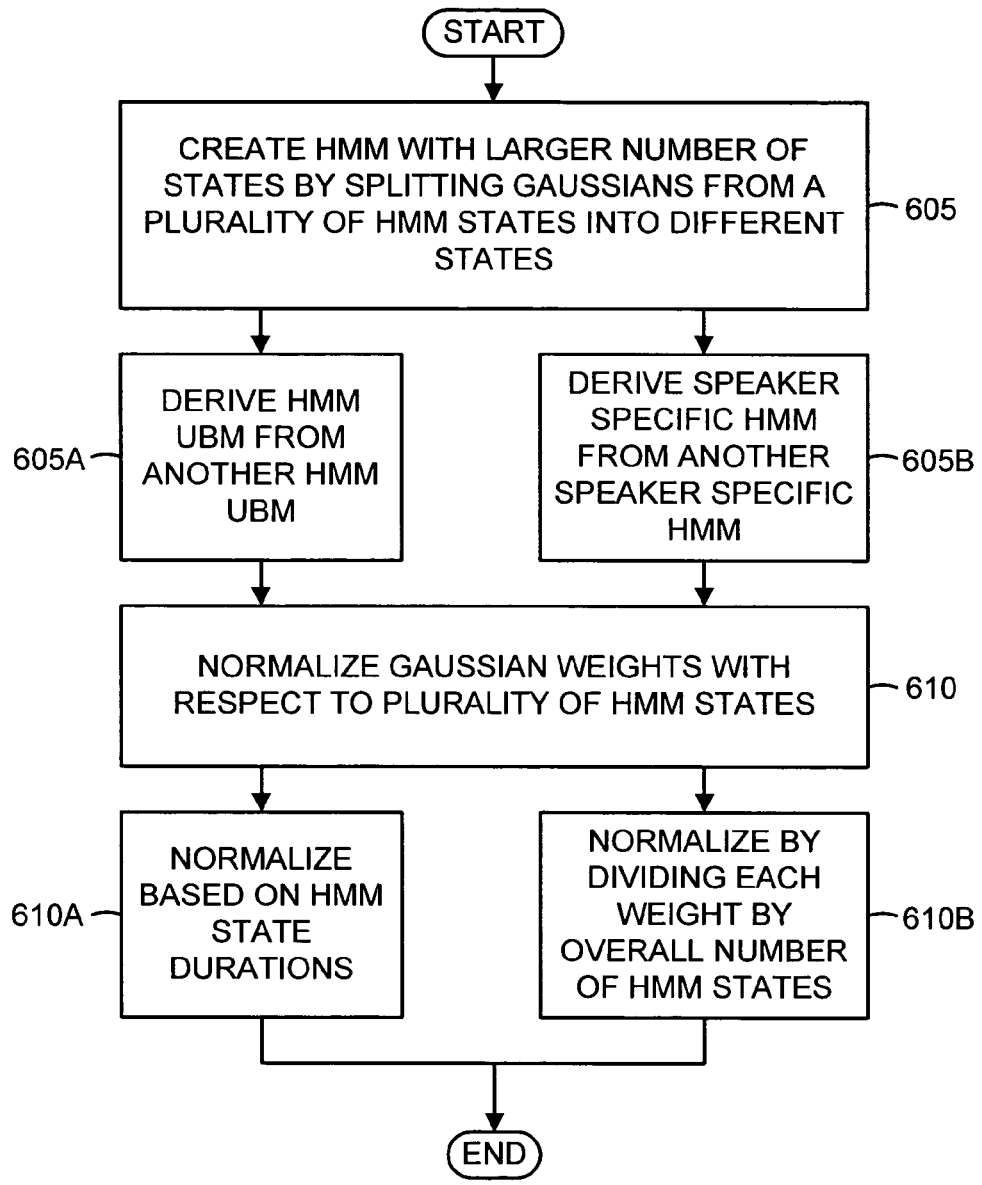
FIG. 6 is a flow diagram illustrating a method for providing TD HMM speaker recognition mode and/or a TC HMM speaker recognition mode in another TD HMM speaker recognition system and/or other TC HMM speaker recognition system, according to an illustrative embodiment of the present invention.

FIG. 6 is a flow diagram illustrating a method for providing TD HMM speaker recognition mode and/or a TC HMM speaker recognition mode in another TD HMM speaker recognition system and/or other TC HMM speaker recognition system, according to an illustrative embodiment of the present invention.

Gaussians from a plurality of HMM states are split into different states to create an HMM with a larger number of states (step 605). Step 605 may include the step of deriving an HMM Universal Background Model (UBM) from another HMM UBM (step 605A) and/or deriving a speaker specific HMM from another speaker specific HMM (step 605B).

Gaussian weights are normalized with respect to the plurality of HMM states (step 610). Step 610 may include the step of normalizing the Gaussian weights based on durations of the plurality of HMM states (step 610A) and/or normalizing the Gaussian weights by dividing each of the Gaussian weights by an overall number of the plurality of HMM states (step 610B).

In the illustrative embodiment of FIG. 6, the other TD HMM speaker recognition system and/or other TC HMM speaker recognition system may include a single HMM per word and the TD HMM speaker recognition mode and/or TC HMM speaker recognition mode may include a single HMM per phoneme. In the other one of the TD HMM speaker recognition system and the TC HMM speaker recognition system, every word represents a numeric value.

Moreover, in the illustrative embodiment of FIG. 6, the other TD HMM speaker recognition system and/or other TC HMM speaker recognition system may include a single HMM per word, and the TD HMM speaker recognition mode and/or TC HMM speaker recognition mode includes a single HMM per phonetic unit. The phonetic unit may be, but is not limited to, a diphone, a triphone, and a sub-phonetic unit. Also, in the other TD HMM speaker recognition system and/or other TC HMM speaker recognition system, every word may represent a numeric value.

Also, in the illustrative embodiment of FIG. 6, the other TD HMM speaker recognition system and/or other TC HMM speaker recognition system may include a single HMM per phrase, and the TD HMM speaker recognition mode and/or TC HMM speaker recognition mode may include a single HMM per word.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A method, comprising the steps of:
providing a Text Independent (TI) speaker recognition mode in one of a Text Dependent (TD) Hidden Markov Model (HMM) speaker recognition system and a Text Constrained (TC) HMM speaker recognition system,
wherein said providing step comprises:
creating a Gaussian Mixture Model (GMM) by pooling Gaussians from a plurality of HMM states; and
normalizing Gaussian weights with respect to the plurality of HMM states.

2. The method of claim 1, wherein said creating step comprises at least one of the steps of deriving a GMM Universal Background Model (UBM) from an HMM UBM and deriving a speaker specific GMM from a speaker specific HMM.

3. The method of claim 1, wherein said normalizing step one of normalizes the Gaussian weights based on durations of the plurality of HMM states and normalizes the Gaussian weights by dividing each of the Gaussian weights by an overall number of the plurality of HMM states.

4. The method of claim 1, wherein the one of the TD HMM speaker recognition system and the TC HMM speaker recognition system is based on one of a single HMM per word, a single HMM per phonetic unit, and a single HMM per sub-phonetic unit.

5. A method, comprising the steps of:
providing one of a Text Dependent (TD) Hidden Markov Model (HMM) speaker recognition mode and a Text Constrained (TC) HMM speaker recognition mode in a Text Independent (TI) Gaussian Mixture Model (GMM) speaker recognition system,
wherein said providing step comprises:
creating an HMM by assigning states to Gaussians from a GMM; and
calculating state transition probabilities and Gaussian weights with respect to a plurality of HMM states.

6. The method of claim 5, wherein said creating step comprises at least one of the steps of deriving a HMM Universal Background Model (UBM) from a GMM UBM and deriving a speaker specific HMM from a speaker specific GMM.

7. The method of claim 5, wherein said calculating step calculates the state transition probabilities and the Gaussian weights one of based on durations of the plurality of HMM states and based on only an overall number of the plurality of HMM states.

8. The method of claim 5, wherein the one of the Text Dependent (TD) Hidden Markov Model (HMM) speaker recognition mode and the Text Constrained (TC) HMM speaker recognition mode is based on one of a single HMM per word, a single HMM per phonetic unit, and a single HMM per sub-phonetic unit.

9. A method, comprising the steps of:
providing one of a Text Dependent (TD) Hidden Markov Model (HMM) speaker recognition mode and a Text Constrained (TC) HMM speaker recognition mode in another one of a TD HMM speaker recognition system and a TC HMM speaker recognition system,
wherein said providing step comprises:
creating an HMM with one of a smaller number of states and a larger number of states by one of pooling Gaussians from a plurality of HMM states into a single HMM state and splitting the Gaussians from the plurality of HMM states into different HMM states, respectively; and
normalizing Gaussian weights with respect to the HMM states.

10. The method of claim 9, wherein said creating step comprises at least one of the steps of deriving an HMM Universal Background Model (UBM) from another HMM UBM and deriving a speaker specific HMM from another speaker specific HMM.

11. The method of claim 9, wherein said normalizing step one of normalizes the Gaussian weights based on HMM state durations and normalizes the Gaussian weights by dividing each of the Gaussian weights by an overall number of the HMM states.

12. The method of claim 9, wherein the other one of the TD HMM speaker recognition system and the TC HMM speaker recognition system includes one of a single HMM per phoneme and a single HMM per phonetic unit, and the one of the TD HMM speaker recognition mode and the TC HMM speaker recognition mode includes a single HMM per word.

13. The method of claim 9, wherein the other one of the TD HMM speaker recognition system and the TC HMM speaker recognition system includes a single HMM per word and the one of the TD HMM speaker recognition mode and the TC HMM speaker recognition mode includes a single HMM per phrase.

14. A program storage device readable by machine, tangibly embodying a program of instructions executable by the machine to perform method steps for providing one of the TD HMM speaker recognition mode and the TC HMM speaker recognition mode in the other one of the TD HMM speaker recognition system and the TC HMM speaker recognition system as recited in claim 9.

* * * * *